United States Patent
Profumo et al.

(10) Patent No.: US 6,347,096 B1
(45) Date of Patent: Feb. 12, 2002

(54) METHOD FOR STRUCTURING OF DIGITAL DATA WHICH CAN BE TRANSFERRED IN BOTH DIRECTIONS ON A PASSIVE OPTICAL NETWORK (PON) IN A PON TDMA SYSTEM

(75) Inventors: Alberto Profumo, Milan; Lucio D'Ascoli, Udine; Franco Serio, Milan; Angelo Podesta, Limido Comasto; Pierluigi Castoldi, Abbiategrasso, all of (IT)

(73) Assignees: Italtel SPA; Seimens Information and Communicaton Networks, S.p.A., both of Milan (IT)

( * ) Notice: Subject to any disclaimer, the term of this patent is extended or adjusted under 35 U.S.C. 154(b) by 0 days.

(21) Appl. No.: 09/194,442
(22) PCT Filed: May 23, 1997
(86) PCT No.: PCT/EP97/02717
  § 371 Date: Jan. 21, 1999
  § 102(e) Date: Jan. 21, 1999
(87) PCT Pub. No.: WO97/45972
  PCT Pub. Date: Dec. 4, 1997

(30) Foreign Application Priority Data

May 27, 1996 (IT) .......................... MI96A1064

(51) Int. Cl.[7] .................................................. H04J 3/00
(52) U.S. Cl. .................................... 370/476; 370/442
(58) Field of Search ......................... 370/395, 442, 370/458, 470, 486, 487, 490, 471, 476, 395.1

(56) References Cited

U.S. PATENT DOCUMENTS

| | | | |
|---|---|---|---|
| 5,509,003 A | * 4/1996 | Snijders et al. | 370/470 |
| 5,517,502 A | * 5/1996 | Bestler et al. | 370/486 |
| 5,543,951 A | * 8/1996 | Moehrmann | 370/490 |
| 5,579,310 A | * 11/1996 | Heiles et al. | 370/470 |
| 5,579,321 A | * 11/1996 | Van Grinsven et al. | 370/487 |
| 5,761,197 A | * 6/1998 | Takefman | 370/458 |
| 5,850,400 A | * 12/1998 | Eames et al. | 370/458 |
| 5,881,059 A | * 3/1999 | Deschaine et al. | 370/486 |
| 5,889,773 A | * 3/1999 | Stevenson, III et al. | 370/487 |
| 5,926,478 A | * 7/1999 | Ghaibeh et al. | 370/458 |
| 5,966,163 A | * 10/1999 | Lin et al. | 370/442 |

FOREIGN PATENT DOCUMENTS

EP 0425732 5/1991

OTHER PUBLICATIONS

G. Van Der Plas et al.: "ATM Over Passive Optical Networks: System Design and Demonstration" Fiber Networks For Voice, Video, & Multimedia Service Proceedings, 1992, Boston, MA. pp. 48–57.

* cited by examiner

Primary Examiner—Chau Nguyen
Assistant Examiner—Phuongchau Ba Nguyen (57) ABSTRACT

A method for transmission of data through an optical network includes defining transmission frames for upstream and downstream directions between an optical line termination and at least one optical network unit of an optical network. A multiple frame is defined consisting of an integer number multiple of a group of frames. A distinct value is assigned to a header portion of a useful field of a first fundamental block in the first frame of each multi-frame. The distinct value complies with a requisite composition of a header portion of the asynchronous transfer mode. A useful field is assigned to a fundamental block within the multi-frame such that each slot of the fundamental block has a digital data format compatible with the synchronous digital hierarchy. The remaining fundamental blocks with in a multi-frame have slots assigned to a digital data format compatible with an asynchronous transfer mode system such that digital data from both a broadband source and a narrowband source may be transmitted over the same optical network in an efficient manner.

31 Claims, 3 Drawing Sheets

METHOD FOR STRUCTURING OF DIGITAL DATA WHICH CAN BE TRANSFERRED IN BOTH DIRECTIONS ON A PASSIVE OPTICAL NETWORK (PON) IN A PON TDMA SYSTEM

This application is the national phase under 35 U.S.C. §371 of prior PCT International Application No. PCT/EP97/02717 which has an International filing date of May 23, 1997 which designated the United States of America.

FIELD OF THE INVENTION

The present invention relates to the structuring of digital data, transmitted in both directions, on a passive optical network (PON) inside a broad band PON access system, operating in the user-exchange direction, having Time Division Multiple Access (TDMA), in order to enable a particularly effective transfer of digital data flows, relevant to different service types.

TECHNICAL BACKGROUND

Generally speaking, the different types of services can be classified in two classes:
- broad-band services transferred according to standard asynchronous mechanisms (53 byte ATM packages, called cells)
- narrow-band services carried according to synchronous methods (SDH)

The access network is commonly identified with one or more connection interfaces (of the V type) at the exchange and by different kinds of interfaces (of the S type) for users' terminals, generally connected to equipment placed close to the users.

Figure 1:
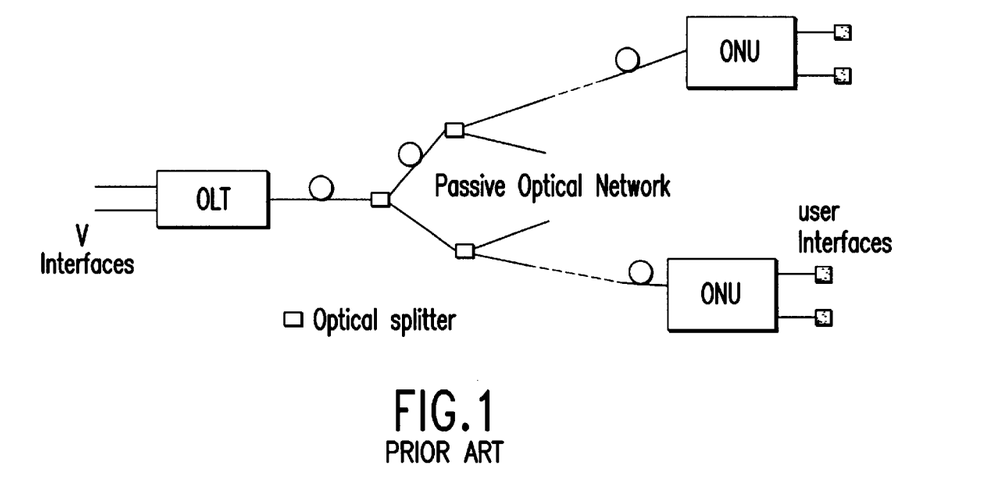
FIG. 1, already described, shows the topological reference diagram of a broad band PON access system.

Equipment used to the above mentioned purpose in the access network and forming the so-called PON access system, are represented by a line termination (Optical Une Termination, or OLT), generally installed or located close to a switching exchange and by a plurality of network units (Optical Network Unit or ONU), typically placed close to the users, connected to the OLT through a passive optical network according to a scheme as shown in FIG. 1.

The passive optical network forming the so-called access network infrastructure, has a typical tree structure, that is point-multipoint, where the root is connected to the OLT and terminal branches to each ONU, and consisting of lengths of optical fibers interconnected with passive optical components, called power splitter/combiners, enabling to split over the outputs or recombine optical signals presenting at their inputs.

The invention finds its general application in telecommunication digital networks and more in particular in the frame of digital networks for broad band integrated services, that is at high bit rate, based on the use of the ATM carrier method and briefly indicated B-ISDN.

In particular, the invention concerns a structuring and transport method, through PON broad band access systems, of transport containers, defined in the frame of Synchronous Digital Hierarchy (SDH) transmission systems, to carry digital data relevant to telephone connections or narrow band integrated services.

For the transport of digital multimedia services in the B-ISDN network, it is specified the use of the package transfer and switching format ATM (Asynchronous Transfer Mode) whose data flows crossing the network, are divided into information blocks having limited and constant width, each one carried by a 53-byte package or cell, out of which 48 bytes representing the so-called payload of each cell, destined to the transfer of the above mentioned data blocks, while the first five bytes, globally represented as a first cell portion called header, identify the information flow the cell belongs to (in other words, the destination address of data carried in the cell payload portion).

To minimize the costs of the PON access system and optimize the performance as for jitter (synchronism phase noise), it is propitious that the bit rate in the downstream direction, or exchange-to-user, is equal to the bit rate of the transmission systems of the Synchronous Digital Hierarchy (SDH) and therefore equal to a multiple of 155.52 MHz.

To assure the effective transfer of new multimedia services, such as for instance interactive television, whose characteristics require a capacity or digital band in the direction exchange-to-user (downstream direction)—where the audio video digital signal flows—considerably higher than the opposite direction (upstream). In this opposite direction in fact only user controls have to be carried. According to the above multimedia application, PON access systems shall have a higher transfer capacity in downstream direction than the opposite one.

The transfer capacity in downstream direction shall assure the support of digital flows relevant to multimedia services for a number of users enabling to make costs of the opto-electronic components necessarily employed for the optical transmission on the PON network acceptable: said number is identified in 500 users at least.

To adequately satisfy 500 users at least, it results that on the basis of typical service and traffic profiles, the net capacity in the downstream direction shall be equal at least to the capacity of level 4 of the SDH hierarchy, equal to 599.04 Mb/s.

In the upstream direction, net capacity can be lower, but equal at least to one quarter of the downstream one, in order to assure the transfer of symmetric flows relevant to narrow band services and, in the future, the transfer of bidirectional multimedia communications.

Additional requirements to be met result from the characteristics of the TDMA protocol used in the PON system: here, the same optical signal emitted by the OLT termination, reaches through the PON all ONU network units, while in the opposite direction, optical signals emitted by each ONU join on the PON to form a unique optical signal received by the OLT.

Using the TDMA protocol, the transmission performed by each unit of the ONU network is allowed only in well defined time intervals in order to avoid that, on a same moment, signals coming from two or more different ONUs can overlap (and therefore cancel each other).

The enabling transmission control, or permit, in each time interval called slot, is generated and transmitted by the OLT to all ONUs: the structure of the digital signal transmitted by the OLT shall then be able to carry said "permit" in each slot of the downstream transmission structure.

In the upstream direction (ONU to OLT) the signal received by the OLT consists of a sequence of signals, coinciding with each slot, coming from different ONUs. The signal corresponding to a given slot, called "burst" can have width differing from the previous one and from the subsequent one, as well as its bit phase can be different, just for the fact that each burst, possibly generated by a ONU different from the one generating the previous burst or from that generating the subsequent burst, follows a different path along the PON: the delay compensation mechanism, called ranging, succeeds in causing that each burst falls with a given accuracy inside the slot, but said accuracy is in the range of some bit only. To assure the phase continuity at bit level between a burst and the subsequent one is impossible for the bit period considered for a broad band PON access system, where the bit period is not higher than 5 nanoseconds.

Due to the above, a phase discontinuity determines between a burst and the other one. Therefore, the OLT receiver shall be able to correctly reconstruct each burst, amplifying it in an adequate manner and using the correct bit sampling phase (or bit clock phase) for each burst. These two operations, recovery of the amplitude and of the sampling phase require a given time equal to tens of bits between a burst and the other one, due to the discontinuity between two bursts: the upstream transmission structure for each slot shall be such that the field, called payload, destined to the transfer of the useful data is preceded by an adequate number of bits, generally called "preamble", to enable the correct performance of the two operations mentioned above to which an additional field, called Guard, has to be put before, during which, the transmission from any ONU is inhibited to prevent that the end of transmission of a given ONU overlaps to the starting of the transmission of another ONU, due to the non accuracy of timing of the different ONU.

An additional requirement comes from the needs of the telecommunication network operators, when they want to use broad band PON access systems in the frame of the cabling of residential user areas or small business areas.

To minimize operation and maintenance costs it is essential in this phase, sharing of the new infrastructure and the new broad band access system by new multimedia services for which the support of the asynchronous ATM format is required and the more traditional narrow band services (among which the telephone services is more spread), typically carried to the interfaces of traditional switching nodes (N-LEX) through synchronous digital flows. In other words, the need arises to define methods enabling the transfer of synchronous flows, as well as of ATM flows through the same system operating on the new optical infrastructure (PON) of the access network.

BACKGROUND ART

A first alternative to carry synchronous flows through a transmission system, when this last is based on the ATM format only, is to convert the flows dedicated to narrow band services, typically structured to the interfaces of traditional switching nodes as digital signals having 2048 Kb/s rated speed, in compliance with the ITU-T G.704 recommendation, when interfaces are of the plesyochronous type (PDH), or as tributary transport modules TU-12, complying with ITU-T G.784 recommendation, when the interfaces are of the synchronous type (SDH) in ATM flows, through the adaptation method known as ATM Adaptation Layer 1 (AAL1), defined in the ITU-T 1.371 recommendation.

To this purpose, see the European patent application no. EP 757.503 in the name of the same applicant, describing a preferred implementation of the above mentioned adaptation method AAL1.

The adaptation function is made by the so-called Inter-Working Units (IWU), which enable to connect synchronous or plesyochronous switching or transmission systems to ATM-based broad band switching or transmission systems.

A second alternative to carry synchronous flows through a transmission system when this one is based on ATM technology only, is that of using the teaching of the European patent application no. EP 651.924 in the name of the same applicant, describing a cellizator/decellizator unit, that is a unit suitable to convert synchronous flows in an ATM cell structured traffic, and vice versa.

Figure 2:
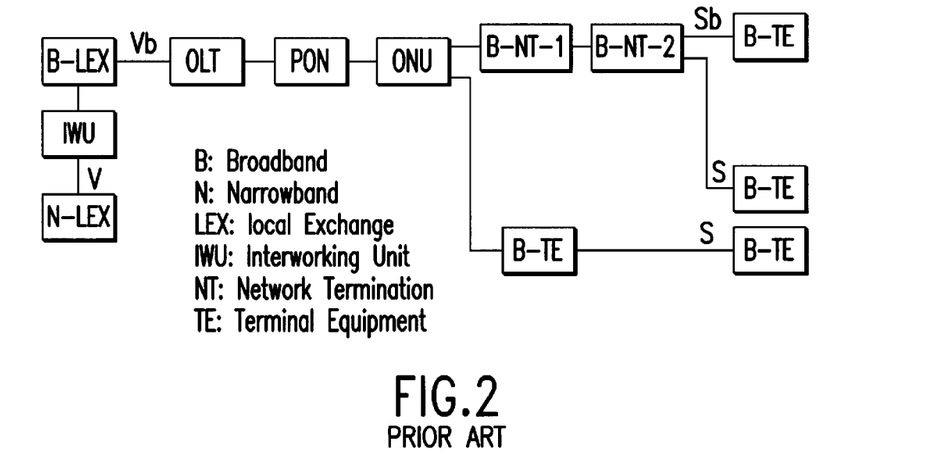
FIG. 2, shows the reference Configuration of a broad band PON access system having transfer structure capable to carry ATM flows only.

FIG. 2 shows the reference configuration of a broad band PON access system and its connections toward the narrow band local exchange (N-LEX) and narrow band terminals (N-TE) when the transmission structure of the PON system enables only the transport of ATM cells; the need clearly appears to use an IWU between the broad band switching node (B-LEX) which the OLT is connected to, and the narrow band one (N-LEX, as between the ONU and narrow band terminals (N-TE); on the ONU side, to convert the ATM flow into narrow band signal and vice versa, it is shown alternatively the possibility to use an NT2 unit. However, this alternative does, not modify the results of the solution, in terms of cost, which transfers on the user, who shall purchase the NT2 unit, the additional costs related to the solution.

Figure 3:
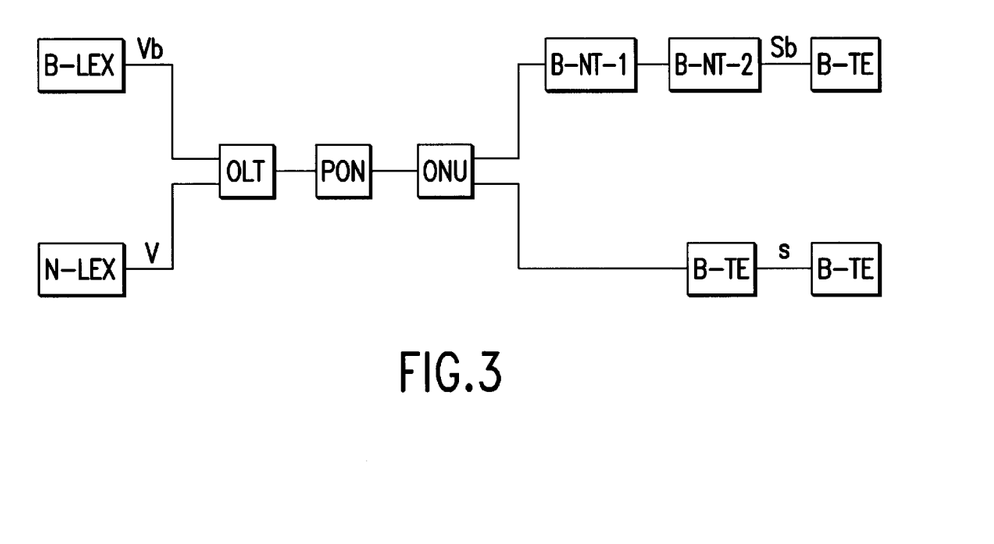
FIG. 3, shows the configuration made possible by the present invention, that is when the transfer structure is capable to carry both ATM flows and synchronous flows relevant to narrow band services.

On the contrary, the solution the implementation of which is intended, is shown in FIG. 3 below. It clearly shows that the OLT is directly connected both to the broad band switching node and to the traditional one through the appropriate interfaces, as the ONU is directly connected to broad band terminals and to narrow ones. In this way costs and additional operation and maintenance charges relevant to IWU units are completely avoided.

This without prejudice to the fact that the broad band PON access system, apart from accounting considerations of the two kinds of traffic, broad and narrow band ATM, has to be always able to assure the maximum flexibility and efficiency, assuring the appropriate quality of the service, without having recourse to additional and complex supplementary functions.

The Northern Telecom company presented at the "European Workshop on ATM Development and Implementation" in May 1993, a transport structure (organization of digital data to be transmitted through a PON) based on a 125 µs frame, divided into a number of time "slots" having variable length, to be destined to the synchronous traffic, followed by a remaining number of slots having fixed length capable to carry. ATM cells (each one of 53 bytes), destined to ATM flows relevant to broad band services.

This transport structure is meagrely flexible in itself and originates problems induced by the inevitable "clusterization" of the ATM traffic, or of the grouping of ATM flows in a narrow portion of the transport structure.

The clusterization phenomenon induces a distortion of the ATM traffic, generally measured in Cell Delay Variation terms (variation of the cell transmission delay versus the delay suffered by other cells, preceding or successive, belonging to the same connection or ATM flow) and therefore it deteriorates the quality of the service, as percieved by the final user, that is as received at the user terminal.

Other proposals for the transport structure arose during the research project RACE 2024 BAF, described in the book "Access to B-ISDN via Passive Optical Networks" published by Wileys & Sons Ltd. These have characteristics hot enabling to meet the requirements mentioned above as a whole: the first one does not enable the transport of synchronous flows in net capacity conditions (higher than 599.04 Mb/s at least) and the line transmission speed (multiple of 155.52 Mb/s) indicated before, because it is based on a structure foreseeing a slot structure consisting of a 3-byte preamble and a 53-byte useful field for the transmission in both the directions, dedicated to ATM cell transport. When the line speed is equal to any multiple of 155.52 Mb/s and in particular to 622.08 Mb/s, line transmission speed of level 4 of the SDH hierarchy, the net capacity is equal to 53/56 (ratio between the useful field and the complete structure) of the line speed, that is to 588.75 Mb/s, value lower than 599.04 Mb/s, that is the capacity indicated above as necessary to assure the support of an adequate number (e.g., 500) of users. Moreover any integer multiple of the duration of a 56-byte slot, equal to 720 ns, cannot exactly coincide with a 125 microsecond period and therefore the proposed structure cannot easily carry the required synchronisms for the transfer of the synchronous traffic.

G. VAN DER PLAS ET AL: "ATM over passive optical networks: system design and demonstration" FIBER NETWORKS FOR VOICE, VIDEO & MULTIMEDIA SERVICE PROCEEDINGS, 1992, BOSTON, Mass., vol. 1786, 1992, pages 48–57, XP000444626, according to which the preamble of the main claim is drafted, discloses an ATM based PON system.

The point-to-multipoint configuration of the PON requires multiplexing and multiple access techniques to provide proper communication for each of the connected subscribers. In the downstream direction an ATM cell based TDM (Time Division Multiplexing) is implemented, while a TDMA (Time Division Multiple Access) protocol controls the upstream access of the subscribers to the network.

The frame structure is of the type including an integer number N of slots so that a one to one relation between each slot forming part of the upstream frame structure is always valid.

In the downstream direction each slot containing a predetermined number of information blocks each one of them consisting of an useful field and of an auxiliary field.

In the upstream direction each slot consisting of a guard field, a preamble field and an useful field, being the transmission speed in the upstream direction substantially equal or sub-multiple of the downstream line transmission speed. The above mentioned PROCEEDINGS does not disclose nevertheless a multiframe structure nor the merging of different type of traffic, i.e. both broadband and narrowband communication on the ATM PON system.

OBJECT OF THE INVENTION

Main object of the invention is to supply a structuring method of the digital data carried in both the directions of a passive optical network (PON) such to eliminate the need to employ IWU units at the ends of the broad band PON access system, either consisting of solutions suitable to implement said adaptation method AAL1 or consisting of said cellization/decellization unit.

Another object is that to enable to optimize the transfer effectiveness of ATM cells avoiding phenomena deriving from the "clusterization" of the ATM traffic, reaching a capacity adequate to the number of users one intends to satisfy, using a multiple of 155.52 Mb/s as line transmission speed.

SUMMARY OF THE INVENTION

Said objects and advantages are achieved through the method of the present invention of structuring:

first digital data pertaining to broadband sources formatted in packets of a fixed number of bytes, a first part of which being assigned to contain a destination information for an asynchronous transfer mode system (Broad-Band ISDN);

second digital data pertaining to narrowband sources formatted in first level tributary transport modules (TU-12 or TU-11) of the SDH (Synchronous Digital Hierarchy) type, said first and second digital data being requested to be simultaneously transferred through a same broad band PON access system, consisting of an Optical Line Termination or OLT and of a plurality of Optical Network Units or ONU, substantially as disclosed in claim 1.

Figure 4:
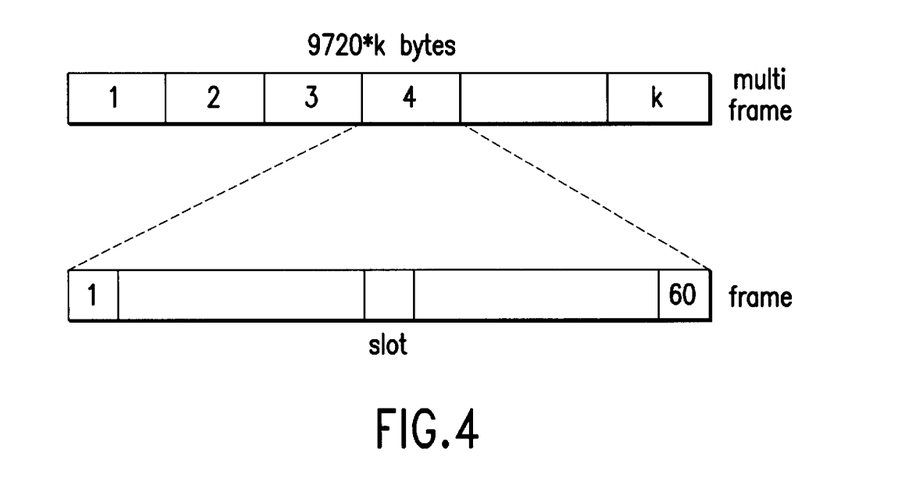
FIG. 4, shows the transport structure based on a fundamental frame, multiframe and integer number N, when this number according to the invention is equal to 60 slots contained in the fundamental frame: the same structure is used for the downstream and the upstream transmission.

In other words, the method according to the invention consists in defining as shown in FIG. 4, a structure of fundamental frame having nominal duration exactly equal to 125 microseconds and a multiframe consisting of a given number k, multiple of four, of fundamental frames, both concerning the downstream transmission, that is the optical transmission in "broadcast" mode through the passive optical network (PON) from the optical line termination (OLT) towards a plurality of Optical Network Termination (ONU) units (symbolically the OLT→ONU flow), and the upstream transmission, that is transmission in the opposite direction, based on a TDMA protocol.

Figure 5:
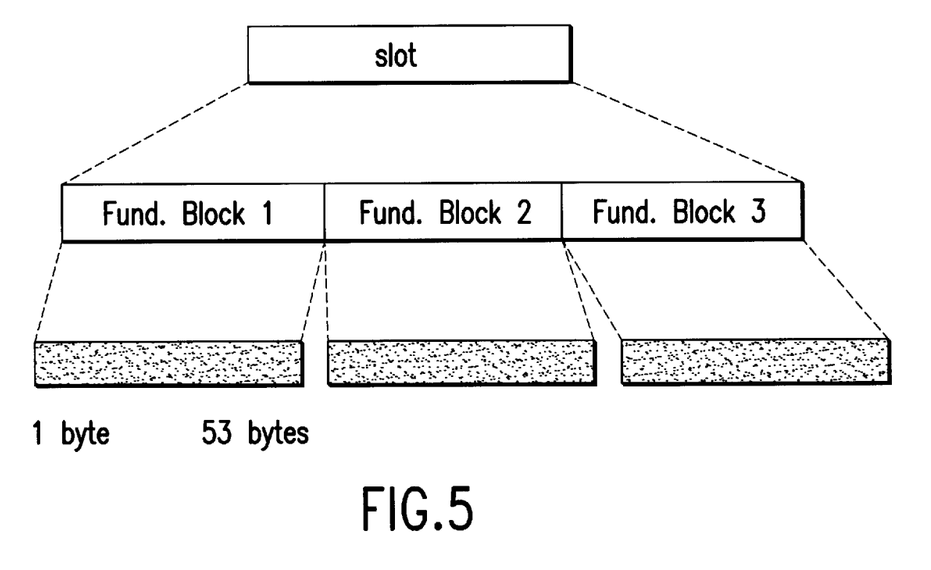
FIG. 5, shows the composition of the slot in the downstream transport structure, when the number m of fundamental blocks is equal to 3, according to the invention.

Each fundamental frame precisely consists of an integer number N of time slots, each of the time slots being in turn formed of an integer multiple m, possibly not higher than four, an essential or fundamental block as shown in FIG. 5, assuming m=3.

The essential block consists in its turn of a 53-byte useful field and of an auxiliary field formed of a single byte.

In this way the total number of bytes included in a frame results from the following formula:

$$NTOT = N*m*54 \tag{1}$$

Considering a line transmission speed of 622.080 Mb/s, that is at level 4 of the equation:

$$\frac{125 \, \mu s * 622.080 \, Mb/s}{8} = \text{number of bytes in } 125 \, \mu s = 9720 \text{ bytes} \tag{2}$$

Replacing in (1) the value 9720, when m=3, it results that N, or the number of slots contained in the frame is equal to 60.

This original approach of the invention enables to use commercial components which can be easily procured on the market, for the generation of line speeds, since they are developed for standard line transmission speeds of the SDH hierarchy.

Always considering the same values used up to now, using the proposed transport structure, 622.08 Mb/s line speed corresponds to a net capacity given by the following expression:

$$C_{net} = 622.08 \times \text{useful field}/(\text{useful+auxillary field}) = 610.56 \, Mb/s$$

Said net capacity is well higher than the 599.04 Mb/s net capacity, indicated above as the one required to adequately satisfy the number of users supported by the system.

In any case, the 53-byte useful field of each block of each slot can alternatively contain:
one ATM cell, or
a tributary transport container TU-12, as defined in G7.09 recommendation, or
one cell (hereinafter called F3mp) containing operation and maintenance data.

Each frame has 125 $\mu$s standard duration and, unlike the known approaches, it is subdivided into an integer number N of slots of the same length, inside which blocks and fields are organized according to a pre-set and identical sequence for each slot.

The frame starting is identified by the presence of an F3t cell in the first block of the first slot of the frame itself. This cell is marked with a specific Header, different from that of all the other cells which can be carried in any other slot of the frame.

The starting of each multiframe is identified by the presence of an F3mt cell in the first block of the first slot of the first frame of the multiframe itself. This cell is marked with a specific Header, different from that of all the other cells which can be carried in any other slot of the frame and different from the F3t cell.

Therefore the so structured data receiving side, or each ONU shall be able to identify the starting of each frame and multiframe through a frame alignment procedure based on the recognition of the above mentioned F3t and F3mt cells thus recovering the frame and multiframe repetition rate.

This "global" periodicity of the frame structure of the invention enables to carry broad band (ATM) flows and narrow band flows (through tributary transfer modules TU-12) using the same broad band PON access system, without the need to adapt narrow band flows inside ATM flows, through IWU units mentioned above.

Another possibility offered by the structure object of the invention is the possibility to include flows of different nature in the useful field with the maximum flexibility.

In other words, each one of the N slots can contain for instance, in the payload portion of the useful field of the first fundamental block a container of tributary transfer TU-12, while useful fields of the other fundamental blocks of the same slot can contain ATM cells, so that the narrow band flow, represented in this case by the container of tributary transfer TU-12, can be "distributed" inside each frame preventing a "clusterization" of said traffic for instance at the beginning of each frame, with considerable advantages in terms of reduction of the Cell Delay Variation caused by the presence of said narrow band flows put in between ATM cells.

The periodicity of the transport structure, guaranteed by the presence of a frame and a multiframe, enables to insert and withdraw the TU-12 contained in a periodical manner and synchronous with the 8 KHz reference (whose period is 125 $\mu s$) and with its sub-multiples, tied to the frame and multiframe repetition rate.

Of course, the position of each narrow band flow, carried through said TU-12 container, in the useful field of one of the M blocks of one or more n slots into which a frame is divided will result repetitive in all the frames for implementation convenience, though based on indifferent principle.

The feature of the present invention which are believed to be novel are set fort with particularity in the appended claims.

BRIEF DESCRIPTION OF THE DRAWINGS

The invention, together with further objects and advantages thereof, may be understood with reference to the following description taken in conjunction with the accompanying drawings and in which.

DETAILED DESCRIPTION OF A PREFERRED EMBODIMENT

Making reference to functional diagrams of FIG. 2 already described, relevant to a reference configuration of the known type of a broad band access system and to the diagram in FIG. 3 showing the reference configuration of an access system according to the present invention, it is possible to immediately evaluate and identify in practical terms the differences in architecture and the advantages offered by the new system compared to the previous one.

In a system based on cellization in the transmission phase and decellization in the tributary units receipt phase, as shown in the diagram of FIG. 2, an information flow organized as a STM-1 frame complying with the specifications and international standards, coming for instance from a telephone public exchange or from a narrow band switching node (N-LEX), is processed inside the "Interworking Unit" IWU, producing a digital flow organized in tributary transport modules TU-12 which are cellizated before being fed to a broad band local switching unit B-LEX. From the broad band local switching unit B-LEX, through the broad band interface Vb, the information flow, all consisting of ATM cells, is sent to the OLT unit and from there broadcast towards the ONU through the passive optical network PON.

Of course, in the opposite direction, the broad band local switching unit B-LEX recognizes the packages of cellizated data (ATM cells) relevant to data pertaining to the Narrow Band traffic and sorts said packages so recognized to the Interworking Unit IWU, which proceeds to the opposite operation, that is the decellization of formatted data and therefore to a reconstruction of tributary units and/or a final reconstruction of the narrow band signal which is sent to the switching local exchange N-LEX.

On the contrary, in the case of the system according to the invention, the broad band asynchronous traffic of ATM cells, coming from the broad band local switching unit B-LEX is supplied to the OLT together with the synchronous flow, formatted in tributary units, directly coming from the narrow band local switching unit N-LEX, the two flows are multiplexed between them and transmitted by the OLT through the PON towards ONUs, and the synchronous flow shall not be priorly submitted to a cellization procedure.

In the opposite direction, the broad band data flow (ATM cells) and the narrow sorted by the OLT, the first one towards the broad band local switching unit B-LEX and the second one towards, the narrow band local switching unit N-LEX, even in this case without the need of decellization of the data flow relevant to narrow band services.

Also on the user side, the two multiplexed flows, one relevant to the broad band traffic (ATM cells) and the other one relevant to the narrow band traffic (TU-12) can preferably and advantageously be sorted at the level of the ONU itself.

The flow of ATM cells is addressed to the network termination unit B-NT-1 and from there to the user unit B-NT-2 which in its turn takes care of the correct addressing of the broad band traffic toward one of the two user's terminals B-TE.

The other information traffic can be directly addressed at ONU level towards an access network termination, user side, NT and from there through a normal telephone loop to the user set N-TE (for instance the telephone set).

Of course, according to the diagram in FIG. 2, the unit B-NT-2 could possibly contain a cellization/decellization circuit of the narrow band traffic (coming from a telephone set or from and ISFN terminal); this requirement should not be required in the case of the organization of the access network according to the invention as shown in FIG. 3.

Figure 6:
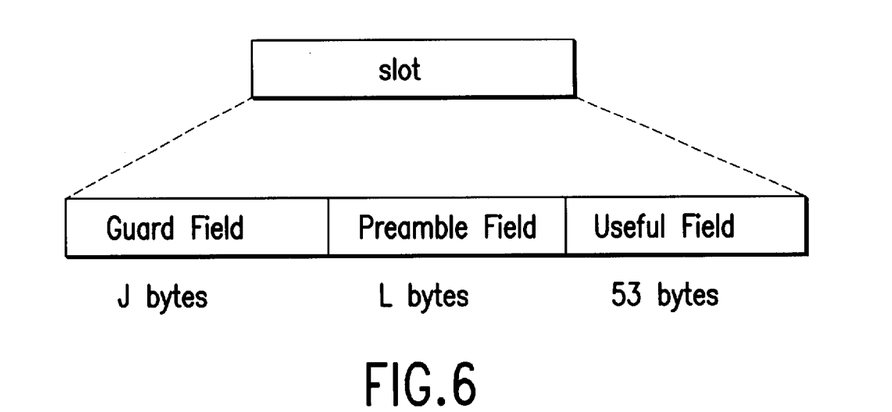
FIG. 6, shows the composition of the slot in the upstream transport structure, according to the invention.

An example for structuring data in a frame and multi-frame according to the method of the invention is given in FIGS. 4, 5 and 6.

According to the shown preferred embodiment, each 9720-byte fundamental frame is divided into 60 slots having identical duration, each one consisting of 354 bytes.

Finally, FIG. 5 and 6 show the structure or content of each 162-byte slot in the downstream and upstream direction, respectively.

Each one of the three fundamental 54 byte blocks contains a preamble byte PR1, PR2 and PR3, respectively, followed by an useful field of 53 bytes.

Said 53 bytes useful field can be an ATM cell defined by an initial 5 byte portion or 48-byte sequence, commonly defined payload portion.

According to the invention, the first of the three payloads of one or more of the 60 slots into which a 9720-byte fundamental frame is subdivided is dedicated to contain data corresponding to a frame of a tributary transport module (TU-12) while the other two groups can contain two ATM cells or one ATM cell and one F3 mp cell for service data.

In any case, the three preamble data PR1, PR2 and PR3 are structured to transmit the so-called "permit" command enabling a particular ONU to transmit data towards the OLT (upstream transmission) in common systems operating according to a time division multiple access scheme (TDMA). The allocation of one of the three groups for the narrow band traffic transmission TU-12 in the frame of the multiframe organization according to the invention can be permanent or semi-permanent, and in any case pre-set at switching exchange or OLT level.

While a particular embodiment of the present invention has been shown and described, it should be understood that the present invention is not limited thereto since other embodiments may be made by those skilled in the art without departing from the scope thereof.

It is thus contemplated that the present invention encompasses any and all such embodiments covered by the following claims.

What is claimed is:

1. A method for transmission of data through an optical network, the method comprising the steps of:
defining transmission frames for both the downstream and upstream directions between an optical line termination and at least one optical network unit of the optical network, each frame having constant duration;
defining an integer number of N slots for said frames, in each transmission direction, so that a one-to-one relation exists between each slot forming part of the downstream frame structure and each slot forming part of the upstream frame structure, is always valid;
defining m fundamental blocks for each slot in the downstream direction m being an integer number of higher than 1, each one of fundamental blocks consisting of a useful field and an auxiliary field;
defining a predetermined number of slots in the upstream direction and allocating a guard field, a preamble field and an useful field in each slot;
defining a multi-frame consisting of an integer number multiple k multiplied by a group of four, of said frames;
assigning a distinct value to a header portion of the useful field of the first fundamental block of the first slot of the first frame of each multi-frame, the distinct value being different from the values assigned to the header portions of the useful field of all the other fundamental blocks, and the distinct value complying with a requisite composition of the header portion of an asynchronous transfer mode cell;
assigning the useful of one of said m fundamental blocks of each slot to the transmission digital data in a first formate compatible with the synchronous digital hierarchy (SDH) and in particular assigning;
i) the first part of the bytes of said useful field to the transmission of a synchronous alignment word, and
ii) the remaining bytes of said useful field to contain said formatted digital data; assigning the remaining of said fundamental blocks in a second format compatible with an asynchronous transfer mode system of each slot to the transmission of digital data.

2. The method according to claim 1, characterized in that the m auxiliary bytes of each slot are used to carry from the optical line termination to the at least one optical network unit enabling controls or permitting the transmission of the enabled optical line termination in a certain slot of the upstream frame structure.

3. The method according to claim 1, further comprising dedicating the useful field of said fundamental blocks to the transport of said first digital data, organized as 53-byte ATM cells, used in the context of broad band digital networks (B-ISDN) while the useful field of one and only one of said m fundamental blocks of one or more of said slots is dedicated to the transport of said digital data, pertaining to narrow band signal sources, organized in a digital stream having rated speed equal to 1544 kb/s or 2048 kb/s, or in first level tributary transport modules (TU-11 or TU-12) as defined in the context of the synchronous digital hierarchy (SDH); arranging a fifth byte of said header portion to comply with a compositional standard for the header portion of the asynchronous transfer mode cell and introducing in the payload portion of said dedicated useful field a frame of a digital data stream or of a first level tributary transport module (TU-12 or (TU-11),
in an upstream transmission, aligning a data structure of said useful field to coincide with each slot of the downstream data structure, where the useful field on one and only one of said m fundamental blocks is dedicated to the transport of said digital data.

4. The method according to claim 1, where the downstream line transmission speed is 622.080 Mbit/s, equal to that defined for STM-4, a synchronous transport module level 4, of the SDH hierarchy, according to Recommendation ITU-U G.709, and the frame consists of 9720 bytes and has a 125 $\mu$s duration, with a frame repetition rate of 8 KHz.

5. The method according to claim 1, wherein each slot of the downstream frame structure consists of 162 bytes and contains three of the fundamental blocks.

6. The method according to claim 5, wherein each slot of the downstream frame structure corresponds to a slot in the upstream data structure consisting of 81 bytes, the upstream bit transmission speed being equal to one-half of the downstream transmission speed.

7. The method according to claim 6, wherein the useful field of a first one of said three fundamental blocks of one or more of the 60 slots of the frame, is dedicated to the transmission of said first format, while the second and third blocks are dedicated to the transmission of second format.

8. The method according to claim 1 further comprising, the step of arranging an auxiliary field serially before the useful field in one of the m fundamental blocks.

9. The method according to claim 1, wherein said first format supports a tributary transport module TU-12, as defined in the recommendation G.709.

10. The method according to claim 1 further comprising identifying the useful field of one of the fundamental blocks of one or more slots by a header, different from all other headers, and dedicating its payload to the transport of service and maintenance data relevant to a broad band PON access system including the optical line termination and the at least one network unit.

11. The method according to claim 1 further comprising dedicating the payload of the useful field of the first block of the first slot of each frame, for the header portion to the transport of service and maintenance data relevant to a broad band PON access system including the optical line termination and at least one network unit.

12. A method for transmission of data through an optical network, the method comprising the steps of:
  defining transmission frames for transmission in upstream and downstream directions between an optical line termination and at least one optical network unit of the optical network;
  organizing the transmission frames into a multi-frame including an integer number multiple of the defined transmission frames;
  assigning a distinct value to a header portion in a first frame of the multi-frame, the distinct value complying with a requisite composition of a header portion of an asynchronous transfer mode cell;
  assigning a useful field to a primary fundamental block within the multi-frame such that each slot of the primary fundamental block has a first data format compatible with a synchronous digital hierarchy; and
  assigning slots in secondary fundamental blocks within the multi-frame to a second data format compatible with an asynchronous transfer mode system such that digital data from both a broadband source and a narrowband source may be transmitted via the multi-frame over the optical network in an efficient manner.

13. The method according to claim 12 further comprising the step of: defining an integer number of N slots for said frames in the upstream direction and N slots in the downstream direction.

14. The method according to claim 13 further comprising the step of defining m fundamental blocks of the primary and secondary blocks for each of the N slots in the downstream direction from the optical line termination to the at least one network unit, each of the m fundamental blocks including a useful field and an auxiliary field, where m is an integer number greater than 1.

15. The method according to claim 12 further comprising the step of defining a predetermined number of slots in the upstream direction and allocating a guard field, a preamble field and an useful field in each slot.

16. The method according to claim 12 wherein the organizing step comprises defining the multi-frame as including an integer number multiple of a group of four of the transmission frames.

17. The method according to claim 12 wherein the step of assigning the distinct value comprises assigning a distinct value to a header portion of the useful field of the first fundamental block in the first slot in the first frame of each multi-frame, the distinct value being different from the values assigned to the header portions of the useful field of all the other fundamental blocks, and the distinct value complying a requisite composition of the header portion of an asynchronous transfer mode cell.

18. The method according to claim 12 wherein the step of assigning the useful field comprises the following sub-steps:
  assigning the useful field of one of the fundamental blocks of each slot to the transmission of digital data in a first format compatible with the synchronous digital hierarchy (SDH);
  allocating the first part of the bytes of said useful field to the transmission of a synchronous alignment word, and
  allocating the remaining bytes of said useful field to contain said formatted digital data.

19. The method according to claim 12 wherein the primary block comprises a first block and the secondary blocks comprise a second and third blocks, and wherein the useful field is dedicated to the first block.

20. The method according to claim 12 further comprising the step of arranging an auxiliary field serially before a useful field in one of the fundamental blocks.

21. A communications network for transmission of data, the communications network comprising:
  a passive optical network having an upstream end and downstream ends;
  an optical line termination coupled the upstream end, the optical line termination adapted to transmit a multi-frame composed of a positive integer multiple of frames in a downstream direction, a header portion in a first frame of the multi-frame being compliant with a requisite composition of a header portion of an asynchronous transfer mode cell, the optical line termination assigning a useful field to a primary fundamental block within the multi-frame such that each slot of the primary fundamental block has a first data format compatible with a synchronous digital hierarchy and assigning slots in secondary fundamental blocks within the multi-frame to a second data format compatible with an asynchronous transfer mode system; and
  a plurality of optical network units coupled to the downstream ends, the plurality of optical network units adapted to transmit a time division multiple access mode in an upstream direction.

22. The communications network according to claim 21 wherein the optical line termination unit defines an integer number of N slots for the frames in the in the downstream direction.

23. The communications network according to claim 22 wherein the optical line termination defines m fundamental blocks of the primary and secondary blocks for each of the N slots in the downstream direction, each of the m fundamental blocks including a useful field and an auxiliary field, where m is an integer number greater than 1.

24. The communications network according to claim 21 wherein the optical network units define a predetermined number of slots in the upstream direction and allocate a guard field, a preamble field and an useful field in each slot.

25. The communications network according to claim 21 wherein the multi-frame includes an integer number multiple of a group of four of the frames.

26. The communications network according to claim 21 wherein the optical line termination assigns a distinct value to the header portion of the useful field of the first fundamental block in the first slot in the first frame of each multi-frame, the distinct value being different from the values assigned to the header portions of the useful field of all the other fundamental blocks, and the distinct value complying with a requisite composition of the header portion of an asynchronous transfer mode cell.

27. The communications network according to claim 21 wherein the optical line termination assigns the useful field of one of the fundamental blocks of each slot to the transmission of digital data in a first format compatible with the synchronous digital hierarchy (SDH), the optical line termination allocating the first part of the bytes of said useful field to the transmission of a synchronous alignment word, and allocating the remaining bytes of said useful field to contain said formatted digital data.

28. The communications network according to claim 21 wherein the primary block comprises a first block and the secondary blocks comprise a second and third blocks, and wherein the useful field is dedicated to the first block.

29. The communications network according to claim 21 wherein the optical line termination arranges an auxiliary field serially before a useful field in one of the fundamental blocks.

30. The communications network according to claim 21 wherein a broadband exchange and a narrow band exchange are coupled to the optical line termination.

31. The communications network according to claim 21 wherein a broadband network termination and a narrowband network termination are coupled to a corresponding one of the optical networking units.

* * * * *